(12) United States Patent
Galligan et al.

(10) Patent No.: US 11,146,388 B2
(45) Date of Patent: Oct. 12, 2021

(54) SYSTEM AND METHOD FOR APPLICATION-INDEPENDENT COMPARTMENTALIZED ENCRYPTION

(71) Applicant: The United States of America as represented by the Secretary of the Navy, San Diego, CA (US)

(72) Inventors: Matthew Galligan, San Diego, CA (US); Nhan Nguyen, Huntington Valley, PA (US); John P. Waxler, Dresher, PA (US); William Dennis Bressler, Zephyr Hills, FL (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 178 days.

(21) Appl. No.: 16/665,190

(22) Filed: Oct. 28, 2019

(65) Prior Publication Data

US 2021/0126774 A1    Apr. 29, 2021

(51) Int. Cl.
*H04L 9/08* (2006.01)
*H04L 29/06* (2006.01)

(52) U.S. Cl.
CPC .......... *H04L 9/0822* (2013.01); *H04L 9/0891* (2013.01); *H04L 63/08* (2013.01)

(58) Field of Classification Search
CPC ..... H04L 9/0891; H04L 9/0827; H04L 9/088; H04L 9/0822; H04L 63/08

USPC ........................................................ 713/171
See application file for complete search history.

(56) References Cited

U.S. PATENT DOCUMENTS

| | | | |
|---|---|---|---|
| 8,509,425 | B2 | 8/2013 | Inami et al. |
| 8,515,062 | B2 | 8/2013 | Nakagata et al. |
| 8,677,505 | B2 | 3/2014 | Redlich et al. |
| 9,866,378 | B2 | 1/2018 | Hakoda et al. |
| 9,898,617 | B2 | 2/2018 | Lehnhardt et al. |
| 2017/0039386 | A1* | 2/2017 | Lehnhardt ............... G06F 16/23 |
| 2019/0147192 | A1* | 5/2019 | Khosravi ............ G06F 9/45558 713/192 |

* cited by examiner

*Primary Examiner* — Benjamin A Kaplan
(74) *Attorney, Agent, or Firm* — Naval Information Warfare Center, Pacific; Kyle Eppele; James R. McGee

(57) ABSTRACT

A method of encrypting a data file includes: opening the data file; selecting, via a first user interface, a portion of the data file; encrypting, via an encryption component, the selected portion of the data file as one of a first level of encryption associated with a first authorized user and a second level of encryption associated with a second authorized user so as to create an encrypted data file; and saving the encrypted data file. The encryption component includes an out-of-band encryption key component having stored therein, a first encryption key associated with the first level of encryption and a second encryption key associated with the second level of encryption.

20 Claims, 21 Drawing Sheets

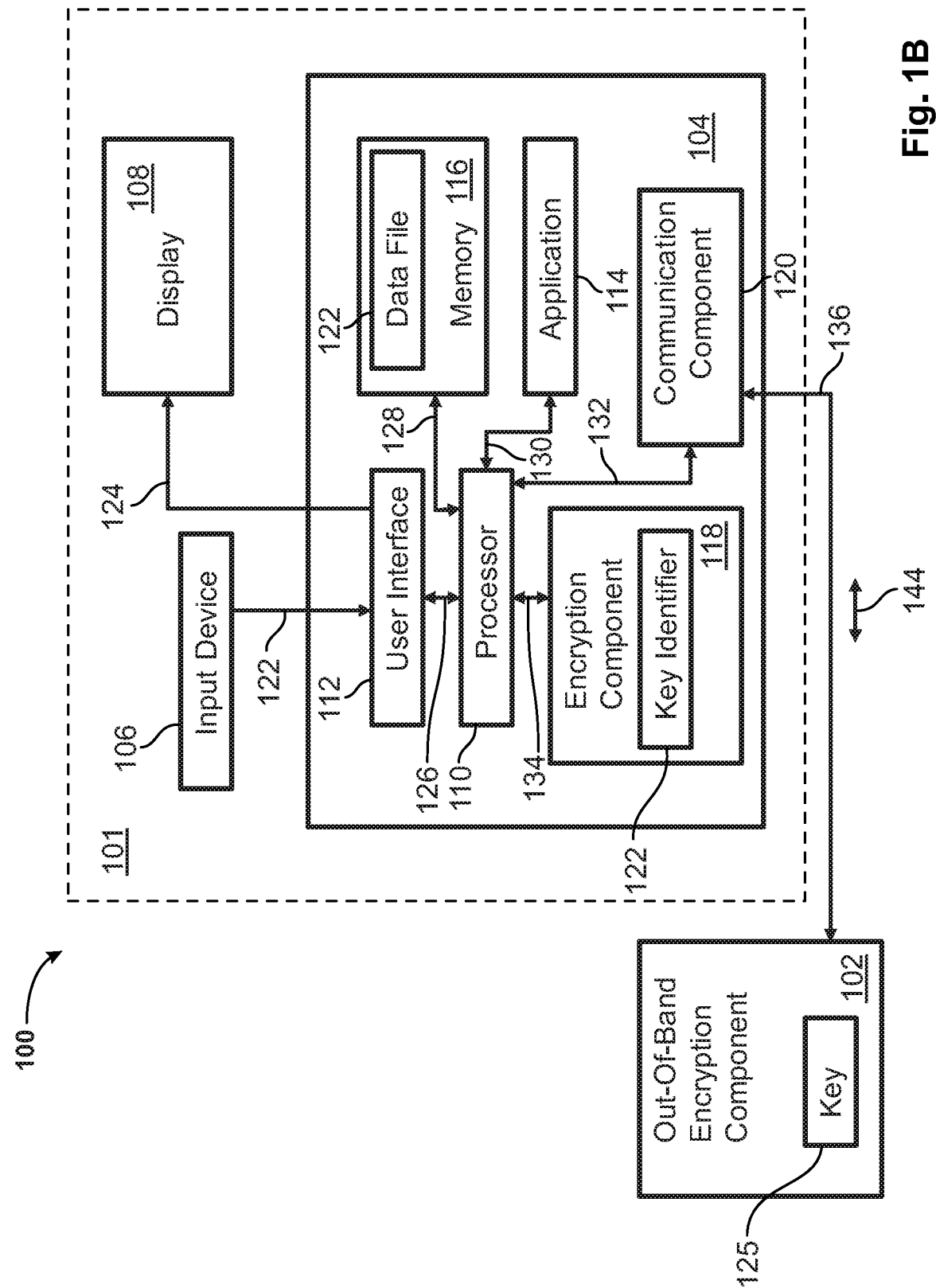

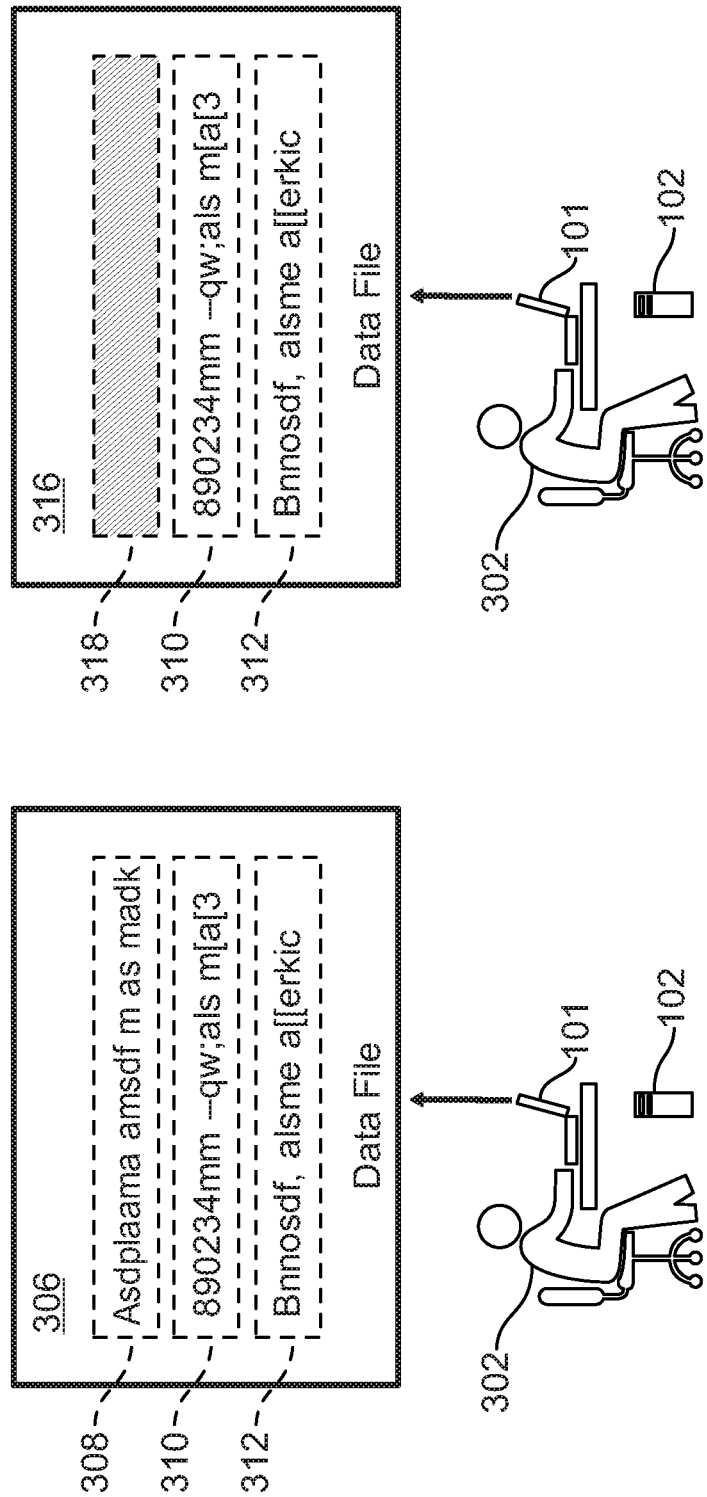

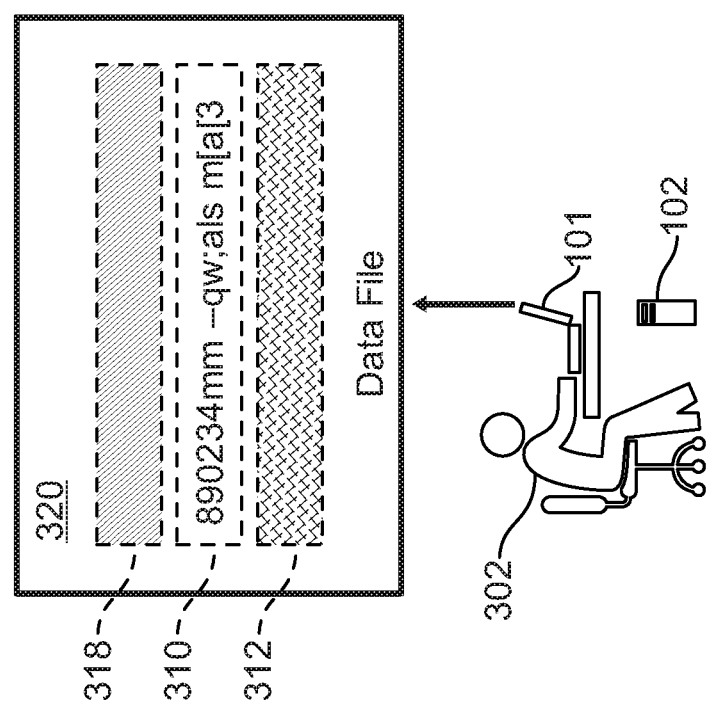

A document

Lorem iosum dolor sit omet, consec-tetur odipiscing slit. Nullo feuoiot oliquom erot quis oonsectetur nunc imperdiet at Aliquom sed grovido gusto, id interdum velit. Vivomus et elit eget nullo mottis plocerot Ut sed efficitur risus tnstique efficitur eros Fusce molesuoda pulvinor mollis Morbi venenotis luctus fmibus Nunc oc erot eget metus eleifend vehiculo id porto nibh Nullo rhoncus diom sed tortor rutrum egestos. Proin oc semper elit Aliquom at ultrices turois Lorem ipsum dolor sit omet corisectetur odipiscing eliL Proeserit dignissim sit omet iosum sit omet dictum Donec sit omet iusto purus Lorem rpsum dolor sit omet, consectetur odipiscing elit Cros locus ligulo rutrum et quom vel molestie cursus leo Pliosellus toucibus of dui

| A-ICE Protected Protection Level | Company Proprietary ▽ |

Lorem iosum dolor sit omet, consec-tetur odipiscing slit. Nullo feuoiot oliquom erot quis oonsectetur nunc imperdiet at Aliquom sed grovido gusto, id interdum velit. Vivomus et elit eget nullo mottis plocerot Ut sed efficitur risus tnstique efficitur eros Fusce molesuoda pulvinor mollis Morbi venenotis luctus fmibus Nunc oc erot eget metus eleifend vehiculo id porto nibh Nullo rhoncus diom sed tortor rutrum egestos. Proin oc semper elit Aliquom at ultrices turois Lorem ipsum dolor sit omet corisectetur odipiscing eliL Proeserit dignissim sit omet iosum sit omet dictum Donec sit omet iusto...

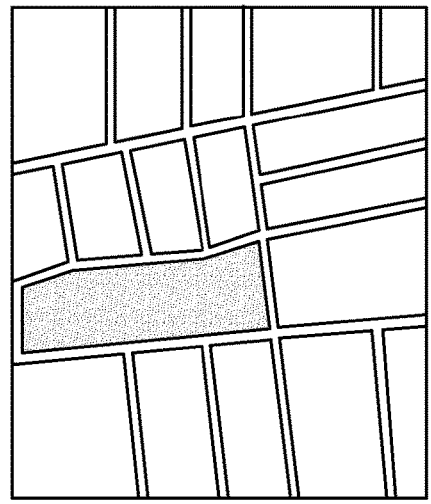

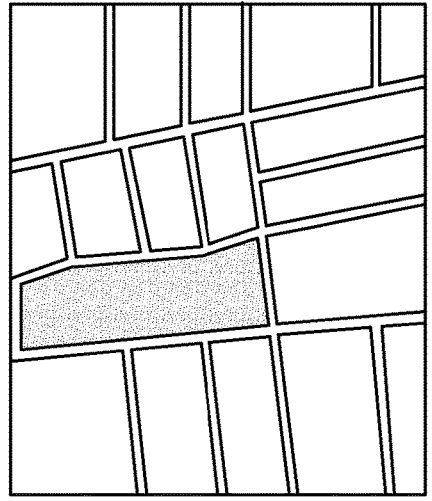

Lorem iosum dolor sit omet, consec-tetur odipiscing slit. Nullo feuoiot oliquom erot quis oonsectetur nunc imperdiet at Aliquom sed grovido gusto, id interdum velit. Vivomus et elit eget nullo mottis plocerot Ut sed efficitur risus tnstique efficitur eros Fusce molesuoda pulvinor mollis Morbi venenotis luctus fmibus Nunc oc erot eget metus eleifend vehiculo id porto nibh Nullo rhoncus diom sed tortor rutrum egestos. Proin oc semper elit Aliquom at ultrices turois Lorem ipsum dolor sit omet corisectetur odipiscing eliL Proeserit dignissim sit omet iosum sit omet dictum Donec sit omet iusto...

Fig. 11

SYSTEM AND METHOD FOR APPLICATION-INDEPENDENT COMPARTMENTALIZED ENCRYPTION

FEDERALLY-SPONSORED RESEARCH AND DEVELOPMENT

The United States Government has ownership rights in this invention. Licensing inquiries may be directed to Office of Research and Technical Applications, Naval Information Warfare Center, Pacific, Code 36000, San Diego, Calif., 92152; telephone (619)553-3001; email: ssc_pac_t2@navy.mil. Reference Navy Case No. 105,002.

BACKGROUND OF THE INVENTION

The present disclosure generally relates to data encryption. In some prior art systems, a data file may be encrypted so that only someone, or a person using a computer, having the correct key may decrypt the data file so as to have access. Further, some encryption systems enable a choice of encryption for multiple different types of access.

However, there are some instances wherein only a certain portion of a data file may need to be encrypted.

There exists a need for a system and method for encrypting specific portions of a data file.

BRIEF DESCRIPTION OF THE DRAWINGS

The accompanying drawings, which are incorporated in and form a part of the specification, illustrate example embodiments and, together with the description, serve to explain the principles of the disclosure. A brief summary of the drawings follows.

FIG. 1B illustrates the system of FIG. 1A at a time $t_2$.

FIG. 3A illustrates a user employing the method of FIG. 2 at time $t_5$.
FIG. 3B illustrates the user of FIG. 3A at a time $t_6$.
FIG. 3C illustrates the user of FIG. 3A at a time $t_7$.

FIG. 11 illustrates another hypothetical screenshot of a file in accordance with aspects of the present disclosure.

DETAILED DESCRIPTION OF THE EMBODIMENTS

The present disclosure provides a system and method for Application-Independent Compartmentalized Encryption (A-ICE), which is a technique to provide single or multiple levels of encryption to new or existing systems to protect sensitive data on the document. This encryption may be provided for the following reasons: 1) to prevent data spillage; 2) to provide multi-category encryption on a particular document or record, ensuring that, for example, a user in the sales department cannot view the social security numbers on the document intended for the human resources department; 3) to add another layer of security to existing systems; 4) to ensure that sensitive data must be willfully selected for decoding and reading, and to be able to log such attempts; 5) to add an additional factor of authentication for data protection by way of an out-of-band (OB) encryption component; and 6) to optionally require the presence of a specific network environment to open and read a particular piece of data.

The system includes two parts. The first is a system that handles the displaying and decrypting of A-ICE data on the end user computing device, non-limiting examples of which include a workstation, a laptop, a mobile phone, etc. The second is a set of encryption keys, stored on an OB encryption component, that are used to handle particular sets of data, and are marked with one or more privilege categories.

When the computing device identifies a piece of data within a file, for example a document fragment, a string, etc. that is marked with A-ICE identifiers, the computing device will overlay the fact that the document is protected. Upon request, it will decrypt the data by accessing a key store in the OB encryption component. If the user does not have access to the key in the OB encryption component, the key will be irretrievable and the data will remain encrypted. Optionally, an "access denied" message may be displayed to the user.

Similarly, when entering new data, a user may instruct the software to encrypt a particular piece of data using A-ICE, and select the key that will be used. This may be performed in existing systems without a need for alteration. For example, this could be introduced into existing documents or web forms. Accordingly, the system is "application-independent."

Figure 1A:
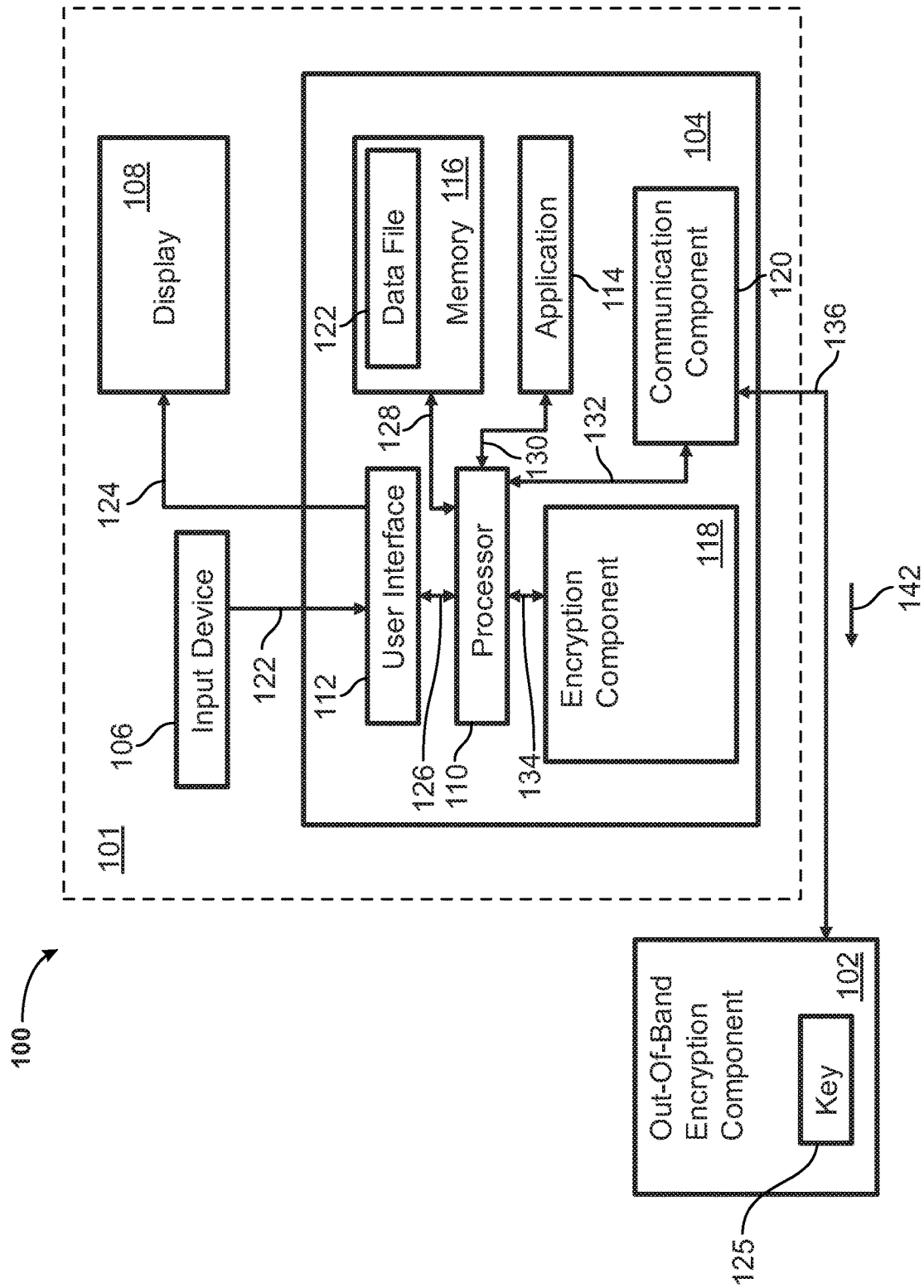
FIG. 1A illustrates a system for compartmentalized encrypting a data file in accordance with aspects of the present disclosure at a time $t_1$.

FIG. 1A illustrates an A-ICE system 100 for compartmentalized encrypting of a data file in accordance with aspects of the present disclosure at a time $t_1$. As shown in the figure, A-ICE system 100 includes a user workstation 101 and an OB encryption component 102. User workstation 101 includes a computer 104, an input device 106 and a display 108. Computer 104 includes a processor 110, a user interface component 112, an application 114, a memory 116, an encryption component 118 and a communication component

120. Memory 116 includes a data file 122 stored therein. OB encryption component 102 includes a key 125 stored therein.

In this example, computer 104, input device 106 and display 108 are illustrated as individual devices. However, in some embodiments, at least two of computer 104, input device 106 and display 108 may be combined as a unitary device. Further, in this example, processor 110, user interface component 112, application 114, memory 116, encryption component 118 and communication component 120 are illustrated as individual devices. However, in some embodiments, at least two of processor 110, user interface component 112, application 114, memory 116, encryption component 118 and communication component 120 may be combined as a unitary device. Further, in some embodiments, at least one of processor 110, user interface component 112, application 114, memory 116, encryption component 118 and communication component 120 may be implemented as a computer having tangible computer-readable media for carrying or having computer-executable instructions or data structures stored thereon. Such tangible computer-readable media can be any available media that can be accessed by a general purpose or special purpose computer. Non-limiting examples of tangible computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Example tangible computer-readable media may be coupled to a processor such that the processor may read information from, and write information to the tangible computer-readable media. In the alternative, the tangible computer-readable media may be integral to the processor. The processor and the tangible computer-readable media may reside in an application specific integrated circuit ("ASIC"). In the alternative, the processor and the tangible computer-readable media may reside as discrete components.

Example tangible computer-readable media may be also be coupled to systems, non-limiting examples of which include a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules may be located in both local and remote computer system storage media including memory storage devices.

Components of an example computer system/server may include, but are not limited to, one or more processors or processing units, a system memory, and a bus that couples various system components including the system memory to the processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

A program/utility, having a set (at least one) of program modules, may be stored in the memory by way of example, and not limitation, as well as an operating system, one or more application programs, other program modules, and program data. Each of the operating system, one or more application programs, other program modules, and program data or some combination thereof, may include an implementation of a networking environment. The program modules generally carry out the functions and/or methodologies of various embodiments of the application as described herein. In this example, application 114 is a program/utility.

Input device 106 is arranged and operable to communicate with user interface component 112 via a communication channel 122. User interface component 112 is additionally arranged and operable to communicate with display 108 via a communication channel 124 and to communicate with processor 110 via a communication channel 126. Processor 110 is additionally arranged and operable to communicate with memory 116 via a communication channel 128, to communicate with application 114 via a communication channel 130, to communicate with communication component 120 via a communication channel 132 and to communicate with encryption component 118 via a communication channel 134. Communication component 120 is additionally arranged and operable to communicate with OB encryption component 102 via a communication channel 136.

Each of communication channels 122, 124, 126, 128, 130, 132, 134 and 136 may be any known type of wired or wireless communication channel.

A method 200 of encrypting a file with A-ICE system 100 will now be described with additional reference to FIG. 2. As shown in the figure, method 200 starts (S202) and a data file is opened (S204). This will be described in greater detail with reference to FIG. 3A.

Figure 2:
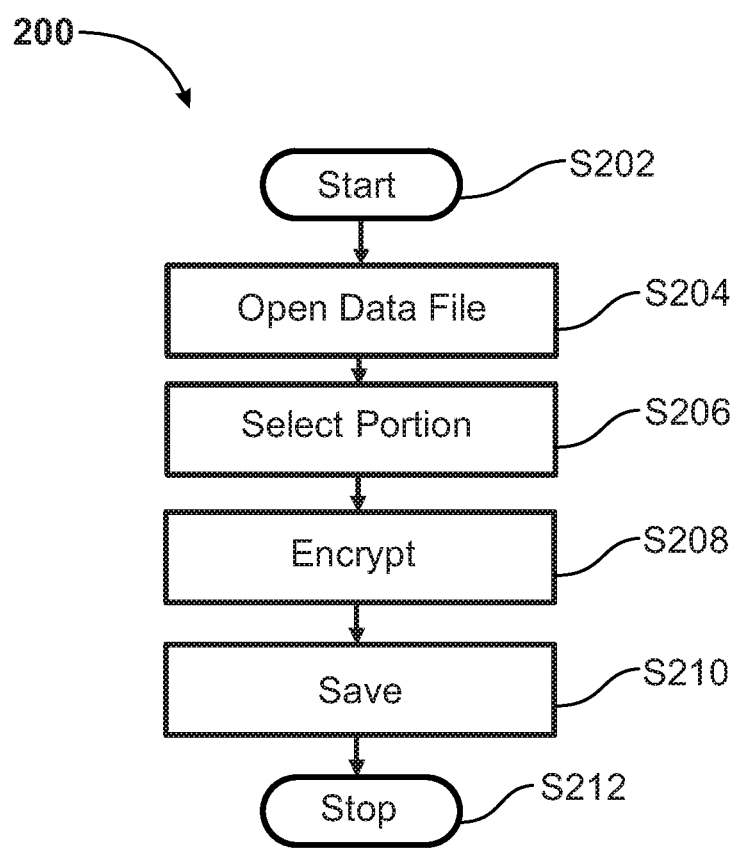
FIG. 2 illustrates a method for compartmentalized encrypting a data file in accordance with aspects of the present disclosure.

FIG. 3A illustrates a user 302 employing the method of FIG. 2 at time $t_1$. As shown in FIG. 3A, user 302 is using user workstation 101 and OB encryption component 102. As shown in FIG. 1A, user 302 accesses application 114 by way of input device 106. In this example, let application 114 be a word processing program. Further, in this example, let user 302 open data file 122 by way of application 114, wherein data file 122 is a previously created word processing document. Further, data file 122 is displayed on display 108. As shown in FIG. 3A, let data file 122 be imaged on display 108 as image 306 having data fields 308, 310 and 312.

For purposes of discussion, let data field 308 have data that should only be viewed by one set of users, e.g., human resource employees, and let data field 312 have data that should only be viewed by another set of users, e.g., payroll employees. In this example, user 302 will want to compartmentalize the data fields and apply different levels of encryption. It should be noted that the different levels of encryption need not have any relation or hierarchy. In some embodiment, the different levels of encryption are associated with different types of privileges.

Returning to FIG. 2, now that the data file is open (S204), a portion of the data file to be compartmentally encrypted is selected (S206). In this example, returning to FIG. 3A, let user 302 select data field 308 for encryption. This selection may be by any known manner, non-limiting examples of which include by input device 106 as keyboard, mouse or stylus, or by touching display 108. Returning to FIG. 2, now that a portion of the data file to be compartmentally encrypted is selected (S206), the portion of the data file is encrypted (S208).

As shown in FIG. 1A, encryption component 118 generates a key identifier request 142, which is routed through processor 110 and communication component 120 to OB encryption component 102. In simple terms, computer 104 is telling OB encryption component 102, "I would like you to encrypt some data, can you please list the keys from which I can choose?"

OB encryption component 102 may have stored therein a plurality of keys that may be used to encrypt data, and a corresponding plurality of key identifiers. Each encryption key itself remains in OB encryption component 102, wherein computer 104 will not have access to the key. However, a key identifier may be passed to computer 104 so that computer 104 may, at a later time, request that a particular key be used to encrypt or decrypt compartmentalized data. In this example, key identifier request 142 requests one of the keys that may be used to encrypt the data within data field 308.

FIG. 1B illustrates the system of FIG. 1A at a time $t_2$. As shown in FIG. 1B, OB encryption component 102 and user workstation 101 handshake and negotiate a key to be used to encrypt the data within data field 308 via any known protocol, shown here as protocol communication 144. In simple terms, computer 104 and OB encryption component 102 may agree that OB encryption component 102 will use, for example, Key A for encryption of data that computer 104 will send to OB encryption component 102.

Figure 1C:
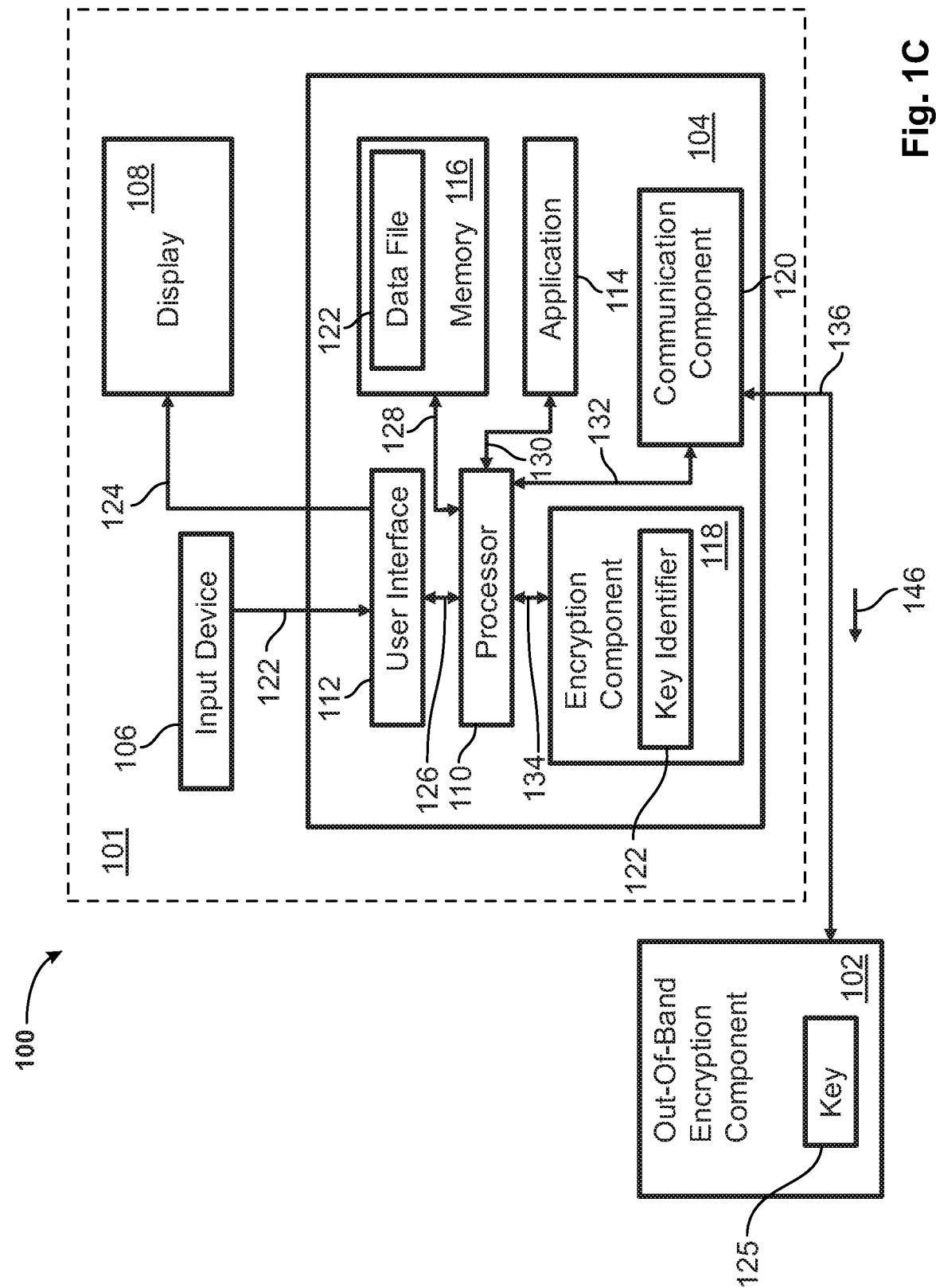
FIG. 1C illustrates the system of FIG. 1A at a time $t_3$.

FIG. 1C illustrates the system of FIG. 1A at a time $t_3$. Once the key to be used has been identified and agreed upon, user workstation 101 provides the data within data field 308 to OB encryption component as passed data 146. In this example, the passed data is string data from a word processing document. However, it should be known that any type of data may be passed for encryption, another non-limiting example of which includes a portion of image data.

Upon receiving the passed data 146, OB encryption component 102 encrypts the data using key 125, which corresponds to the key identifier negotiated during the protocol communication 144.

Figure 1D:
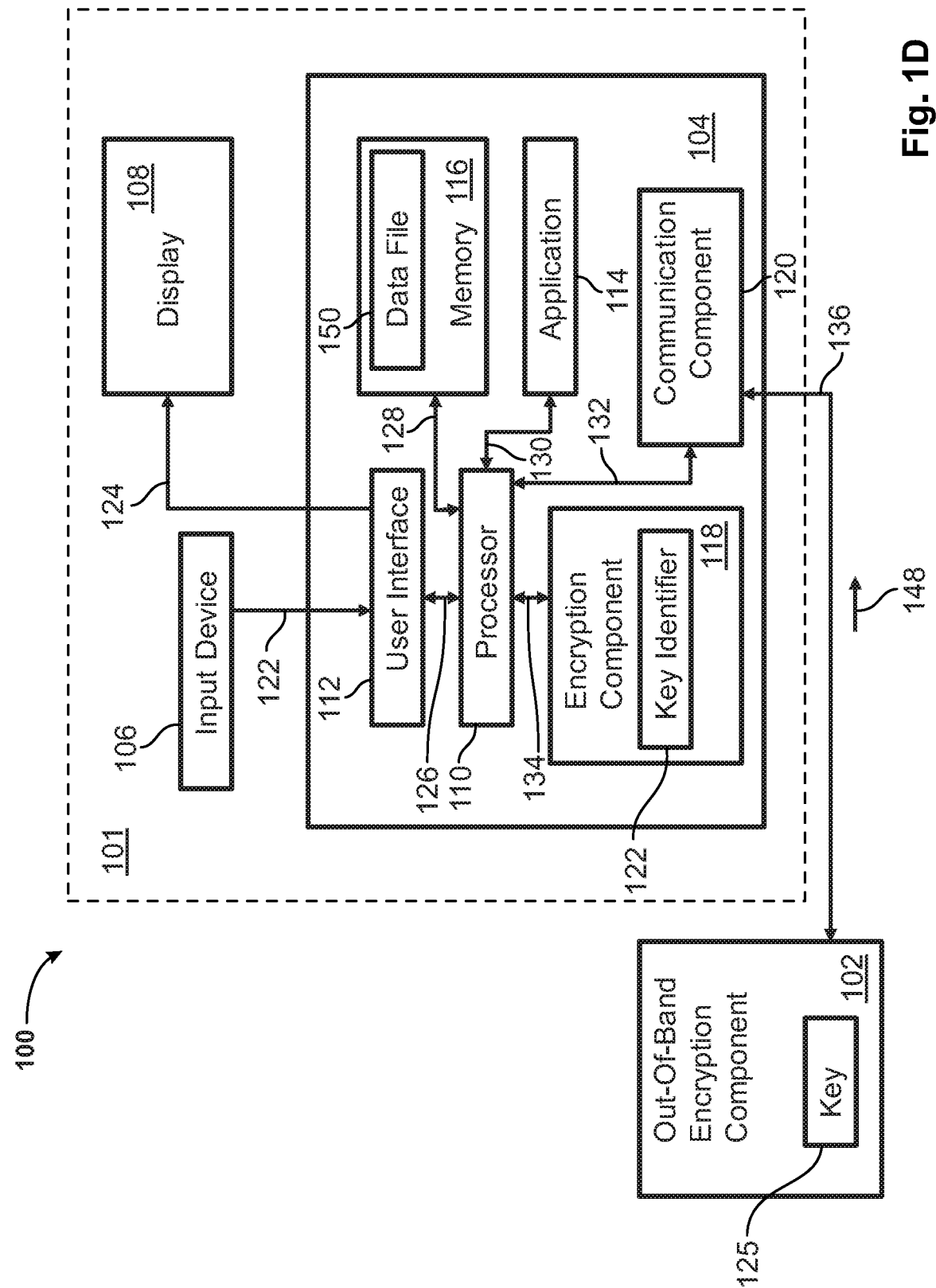
FIG. 1D illustrates the system of FIG. 1A at a time $t_4$.

FIG. 1D illustrates the system of FIG. 1A at a time $t_4$. As shown in FIG. 1D, after the passed data 146 has been encrypted using the negotiated key from OB encryption component 102, the encrypted data 148 is provided to user workstation 101. At this point, as shown in FIG. 2, the compartmentalized encrypted data file is saved (S210). In particular, user workstation 101 then modifies application 114 such that the corresponding data, which includes original data file 122 as modified to include encrypted data 148, is stored as encrypted data file 150 in memory 116.

As shown in FIG. 3B, which illustrates the user of FIG. 3A at a time $t_6$, encrypted data file 150 is imaged on display 108 as image 316. Image 316 has data fields 310, 312 and 318, wherein data field 318 is the encrypted data field corresponding to data field 308 (as shown in FIG. 3A prior to encryption).

After the compartmentalized encrypted data file is saved (S210), method 200 stops (S212). It should be noted that method 200 may be repeated. For example, as mentioned previously, consider the situation where user 302 additionally wishes to encrypt the data in data field 312 so that only payroll employees can view it. This will be described with reference to FIG. 1E, which illustrates the system of FIG. 1A at a time $t_5$.

In such a case: user 302 would select data field 312 (S206); user workstation 101 would request a key identifier, OB encryption component 102 would negotiate a key identifier with user workstation 101 by way of a protocol communication (in this example, let the second key be Key B), user workstation 101 would pass the data of data field 312 to OB encryption component 102 as passed data, OB encryption component would encrypt the passed data using the new key, Key B, negotiated in the protocol communication, OB encryption component would provide the encrypted data 152 to user workstation 101 (S208); user workstation 101 would then modify encrypted data file to create an updated encrypted data file 154 (S210) in memory 116.

As shown in FIG. 3C, which illustrates the user of FIG. 3A at a time $t_7$, updated encrypted data file 154 is imaged on display 108 as image 320. Image 320 has data fields 310, 318 and 322, wherein data field 318 is the encrypted data field corresponding to data field 308 (as shown in FIG. 3A prior to encryption) and data field 322 is the encrypted data field corresponding to data field 312 (as shown in FIG. 3B prior to the additional encryption).

Once a data file has been encrypted, it may be opened and viewed by other people. However, the encrypted portions may not be viewed unless the viewer has access to the required key. This will be described in greater detail with reference to FIGS. 4-6B.

Figure 4:
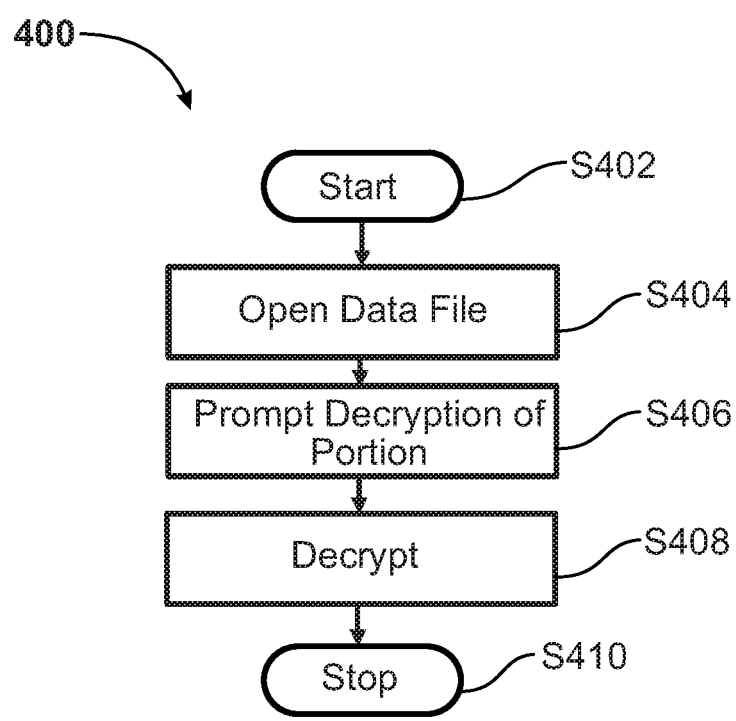
FIG. 4 illustrates a method for decrypting a compartmentalized encrypted data file in accordance with aspects of the present disclosure.

FIG. 4 illustrates a method 400 for decrypting a compartmentalized encrypted data file in accordance with aspects of the present disclosure. As shown in the figure, method 400 starts (S402) and a data file is opened (S404). This will be described in greater detail with reference to FIG. 5A.

FIG. 5A illustrates a user 502 employing the method of FIG. 4 at a time $t_8$. In this example, let user 502 be an employee in the human resources department, who only has authority to view specific data. As shown in FIG. 5A, user 502 is using user workstation 504 and OB encryption component 506. In this example, and for purposes of brevity, let user workstation 504 have similar components to user workstation 101 discussed above. Similarly, let OB encryption component 506 have similar components to OB encryption component 102

In this example, let user 502 open updated encrypted data file 154 by way of an application, wherein updated encrypted data file 154 is displayed on a display as image 320 having data fields 318, 310 and 322.

Figure 5:
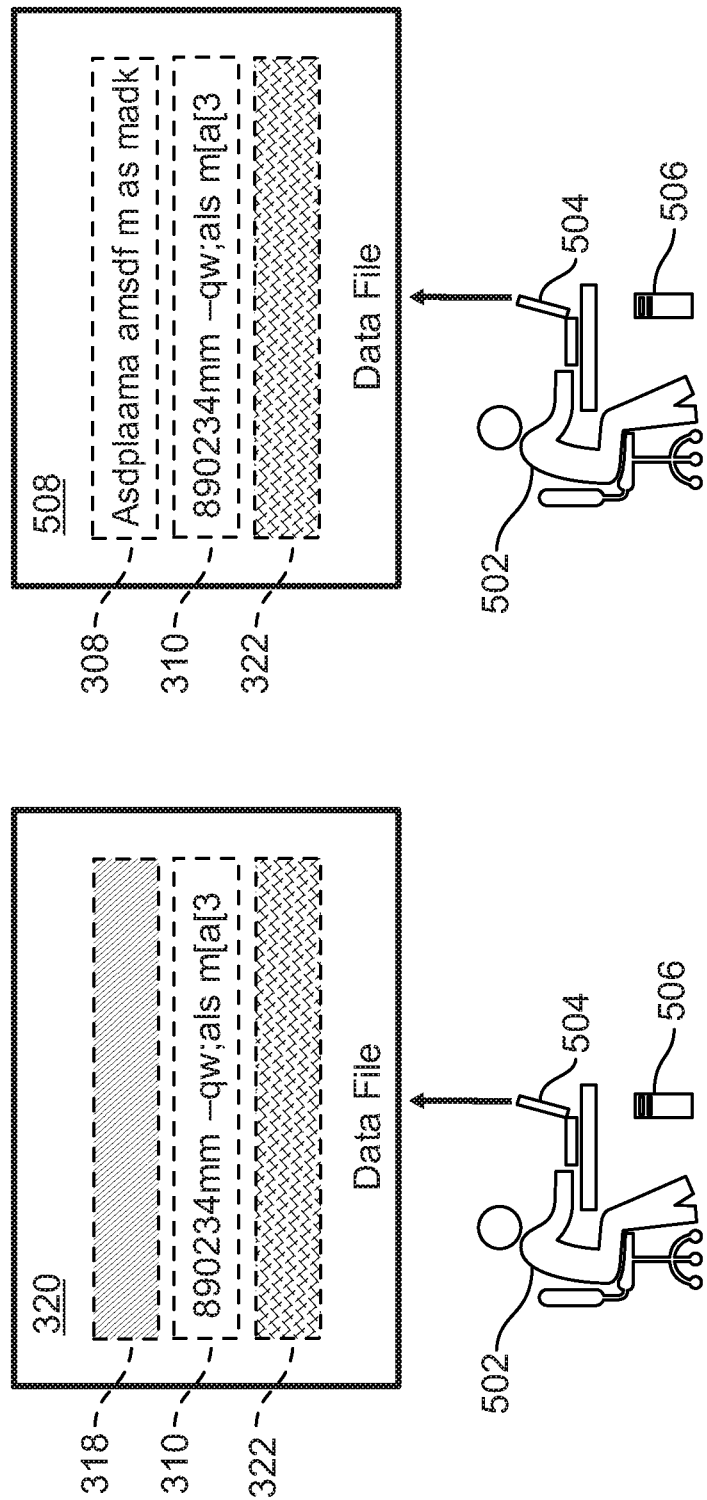
FIG. 5A illustrates a second user employing the method of FIG. 4 at a time $t_8$.
FIG. 5B illustrates the user of FIG. 5A at a time $t_9$.

Returning to FIG. 4, after the data file is opened (S404), the user is prompted to decrypt a portion of the image. For example, as shown in FIG. 5, the encryption component within user workstation 504 may recognize, for example through meta data, a header or other identifier, that data fields 318 and 322 of image 320 have been encrypted by way of an A-ICE system and method. Further, data field 318 may indicate a key identifier associated with a key that is required to decrypt data field 318 and data field 322 may indicate a second key identifier associated with a second key that is required to decrypt data field 322. In such a case, the encryption component within user workstation 504 may instruct the display to display prompt asking user 502 if either or both of data field 318 and data field 322 should be decrypted.

Should the user choose to decrypt either or both of data field 318 and data field 322, encryption component within user workstation 504 would send the corresponding key identifiers to OB encryption component 506. OB encryption component 506 would then check to see if it has stored therein, the keys identified by the key identifiers provided by workstation 504 by way of a protocol communication.

In this example, let OB encryption component 506 only have a key corresponding to the key identifier for decrypting data field 318. In other words, user 502 has an OB encryption component that is tailored to encrypt/decrypt only that data for which user 502 has privileges. In this example, user 502 is a human resource employee that has privileges to view the data in encrypted data field 318, but does not have privileges to view the data in encrypted data field 322.

OB encryption component 506 then decrypts the data of encrypted data field 318 and provides the decrypted data to user workstation 504 (S408). At this point, method 400 stops (S410).

FIG. 5B illustrates the user of FIG. 5A at a time $t_9$. As shown in the figure, image 508 includes previously encrypted data field 318, which has been decrypted, such that user 502 can now view original data as data field 308. However, data field 322 is still encrypted, such that user 502 is unable to view the original data.

Now consider that a person from the payroll department wants to view the data file.

FIG. 6A illustrates a third user 602 employing the method of FIG. 4 at a time $t_{10}$. In this example, let user 602 be an employee in the payroll department, who only has authority to view specific data. As shown in FIG. 6A, user 602 is using user workstation 604 and OB encryption component 606. In this example, and for purposes of brevity, let user workstation 604 have similar components to user workstation 101 discussed above. Similarly, let OB encryption component 606 have similar components to OB encryption component 102. In this example, let user 602 open updated encrypted data file 154 by way of an application, wherein updated encrypted data file 154 is displayed on a display as image 320 having data fields 318, 310 and 322.

Figure 6:
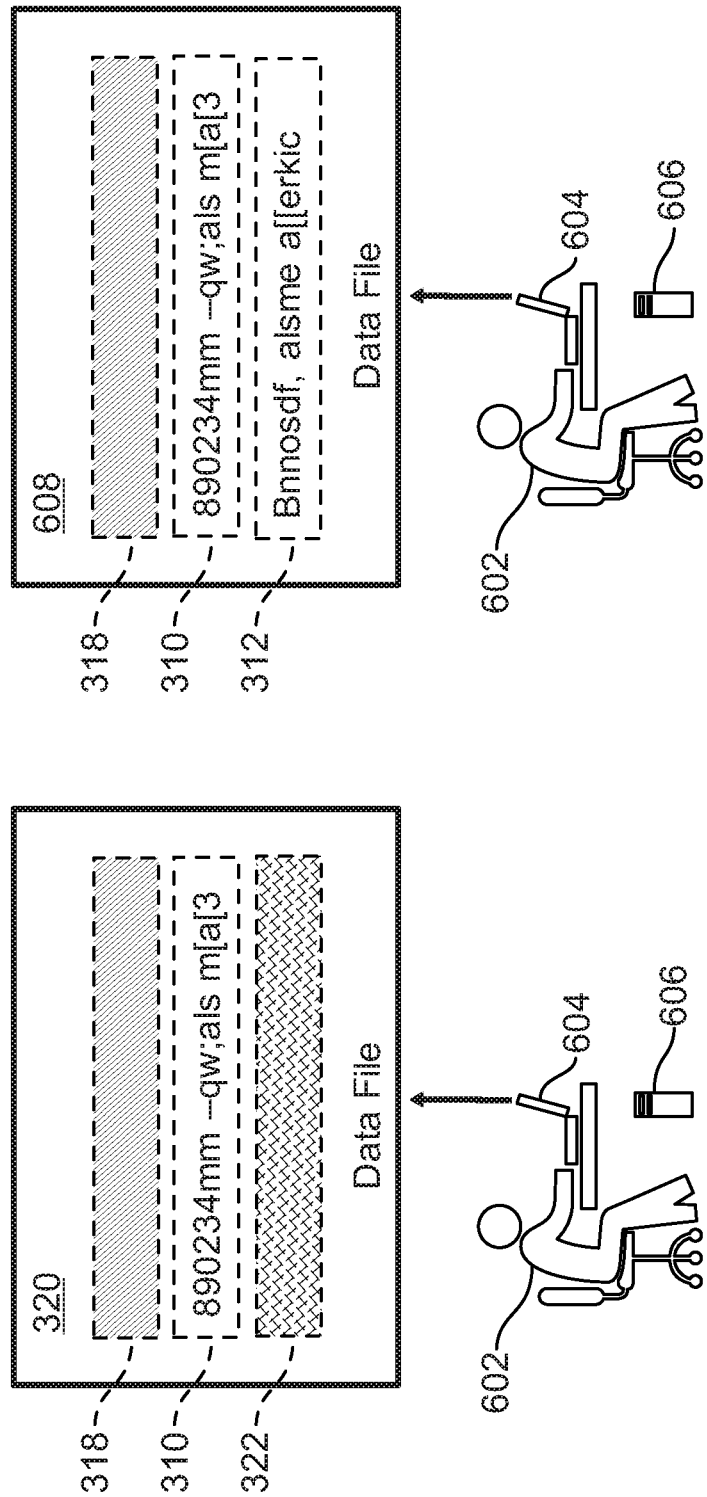
FIG. 6A illustrates a third user employing the method of FIG. 4 at a time $t_{10}$.
FIG. 6B illustrates the user of FIG. 6A at a time $t_{11}$.

Returning to FIG. 4, after the data file is opened (S404), the user is prompted to decrypt a portion of the image. For example, as shown in FIG. 6, the encryption component within user workstation 604 may recognize, for example through meta data, a header or other identifier, that data fields 318 and 322 of image 320 have been encrypted by way of an A-ICE system and method. Further, data field 318 may indicate a key identifier associated with a key that is required to decrypt data field 318 and data field 322 may indicate a second key identifier associated with a second key that is required to decrypt data field 322. In such a case, the encryption component within user workstation 504 may instruct the display to display prompt asking user 602 if either or both of data field 318 and data field 322 should be decrypted.

Should the user choose to decrypt either or both of data field 318 and data field 322, encryption component within user workstation 604 would send the corresponding key identifiers to OB encryption component 606. OB encryption component 606 would then check to see if it has stored therein, the keys identified by the key identifiers provided by workstation 604 by way of a protocol communication.

In this example, let OB encryption component 606 only have a key corresponding to the key identifier for decrypting data field 322. In other words, user 602 has an OB encryption component that is tailored to encrypt/decrypt only such data for which user 602 has privileges. In this example, user 602 is a payroll employee that has privileges to view the data in encrypted data field 322, but does not have privileges to view the data in encrypted data field 318.

OB encryption component 606 then decrypts the data of encrypted data field 322 and provides the decrypted data to user workstation 604 (S408). At this point, method 400 stops (S410).

FIG. 6B illustrates the user of FIG. 6A at a time $t_{11}$. As shown in the figure, image 608 includes previously encrypted data field 322, which has been decrypted, such that user 602 can now view original data as data field 312. However, data field 318 is still encrypted, such that user 602 is unable to view the original data.

In the non-limiting example embodiment discussed above, OB encryption component 102 has two keys stored therein for two different types of encryption. However, it should be noted that an OB encryption component 102 may have any number of keys stored therein in order to encrypt any number of levels or types of encryption.

Figure 1E:
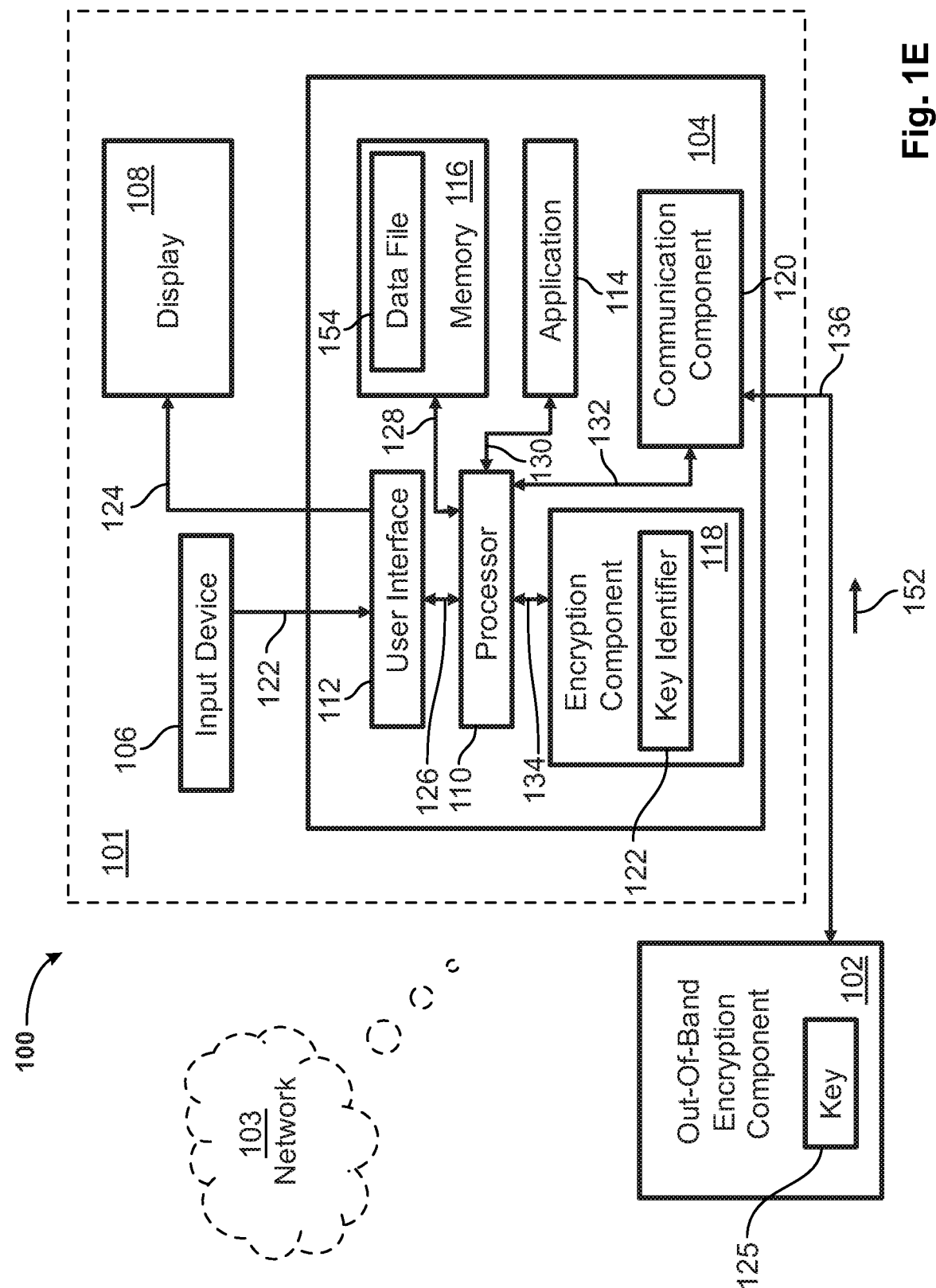
FIG. 1E illustrates the system of FIG. 1A at a time $t_5$.

It should be noted that an A-ICE system and method in accordance with aspects of the present disclosure may additionally incorporate a level of network encryption. For example, as shown in FIG. 1E, user workstation 101 may be connected to a local area network (LAN) 103, either wirelessly or in a wired manner. Further, network 103 may provide an additional level of network encryption. In such a situation, a user may first: open a data file; select a portion of the data file; encrypt the selected portion of the data file in accordance with the A-ICE system and method as discussed above and then additionally encrypt the encrypted data file by way of a network encryption to generate a network encrypted data file. The network encrypted data file may then be saved either to the network or the memory 116. Further, at a later time, a user may open the network encrypted data file and decrypt the network encrypted data file to obtain the encrypted data file. At that point, the user may perform decryption of the encrypted data file in accordance with the A-ICE system as discussed above.

An example scenario of creating sensitive data in a word processor in accordance with the present disclosure will now be described with reference to FIGS. 7-16. It should be noted that the following example scenario is non-limiting, and other non-limiting use cases include web browser form applications audio/video and whole-file encoding.

Figure 7:
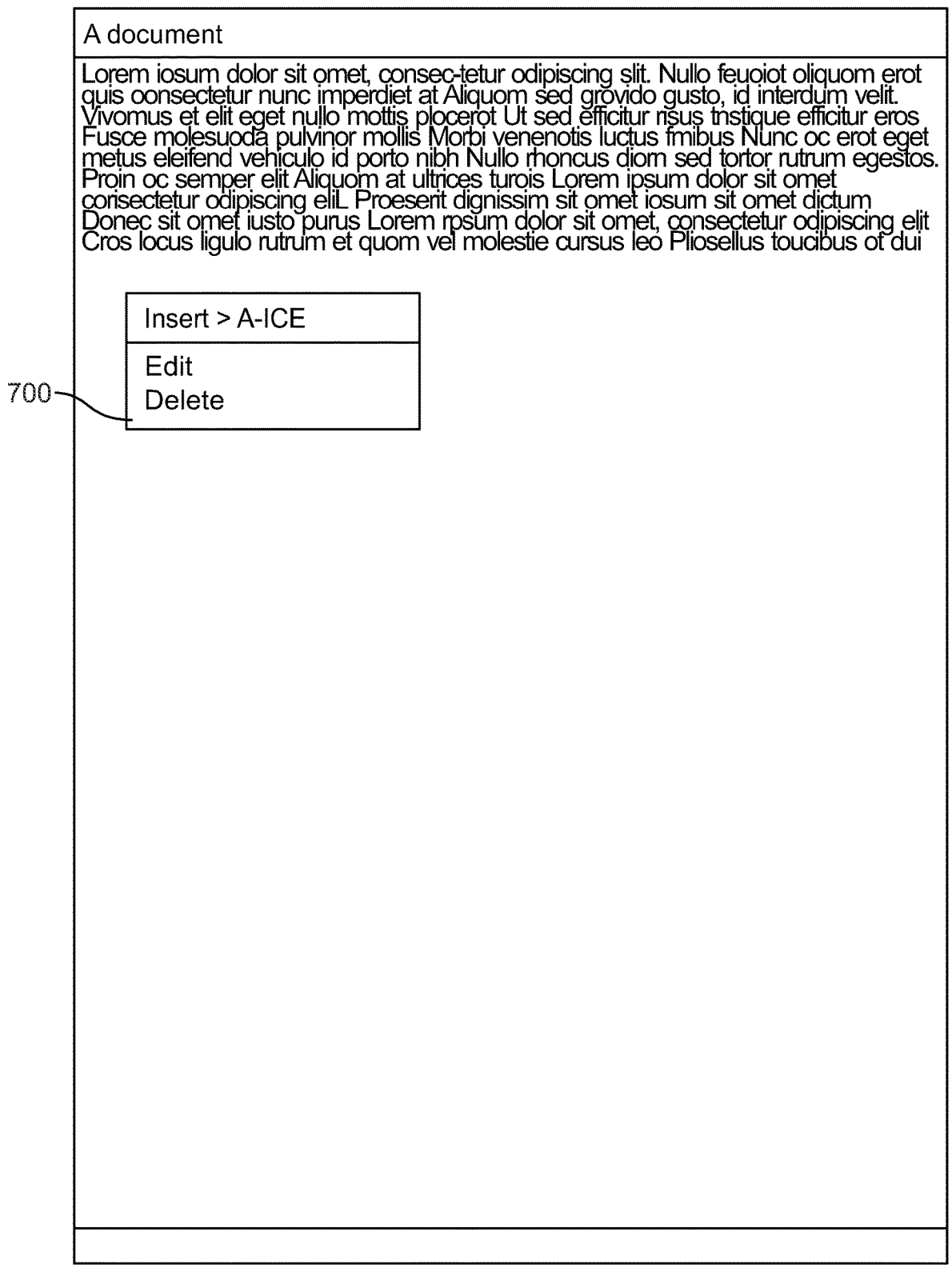
FIG. 7 illustrates a hypothetical screenshot of a file in accordance with aspects of the present disclosure.

In this example, suppose that a user, when editing a document, decides to create a sensitive or compartmentalized section. Using an application plug-in (or native application support), the user creates a data that is marked sensitive and managed by the A-ICE system. This may be performed via a context menu 700 or similar operation as shown in FIG. 7.

Figure 8:
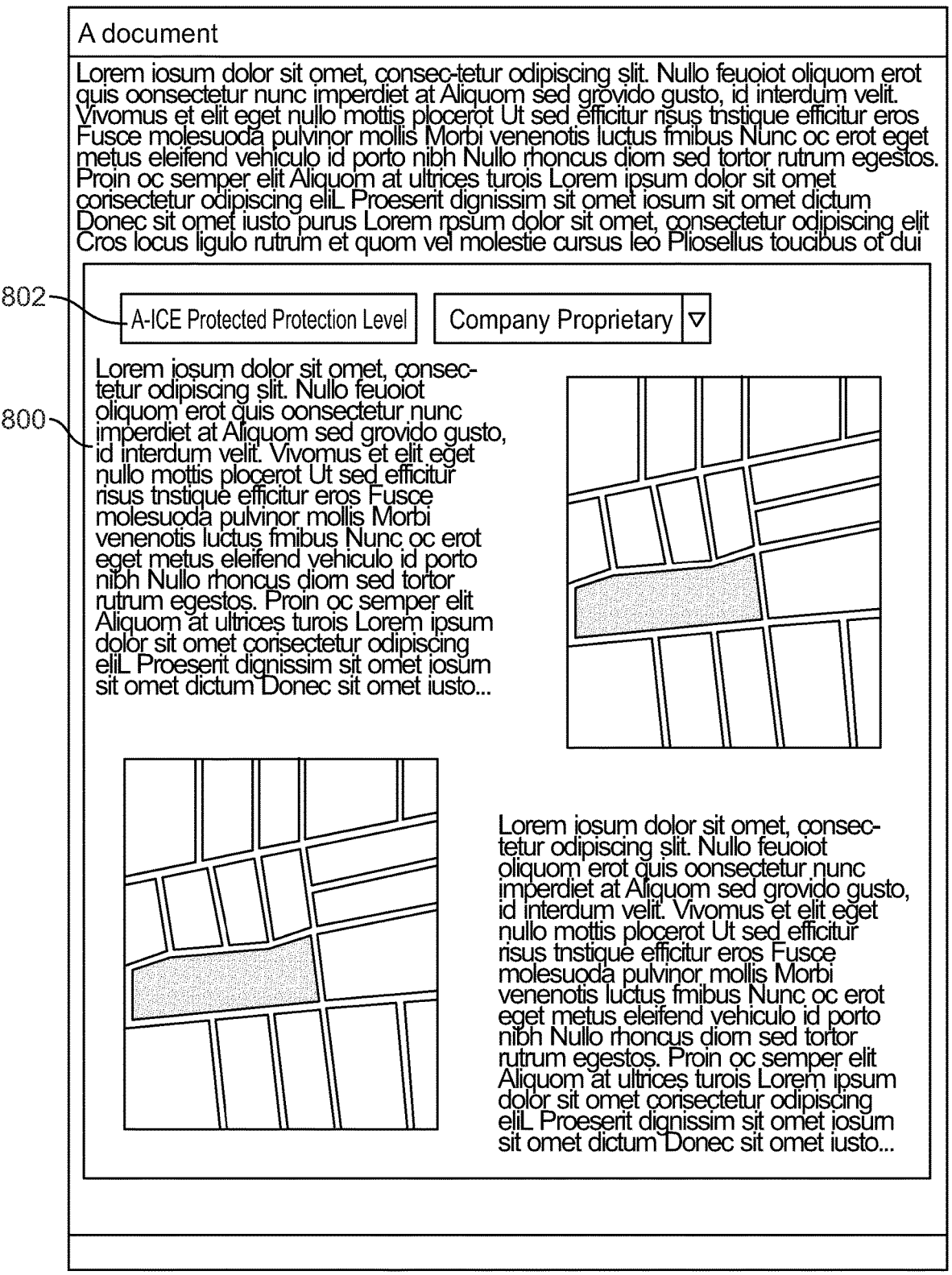
FIG. 8 illustrates another hypothetical screenshot of a file in accordance with aspects of the present disclosure.

As shown in FIG. 8, an A-ICE system in accordance with the present disclosure creates a new section 800 to be encrypted, and the user is provided with an interface 802 for creating content within the A-ICE container.

Figure 9:
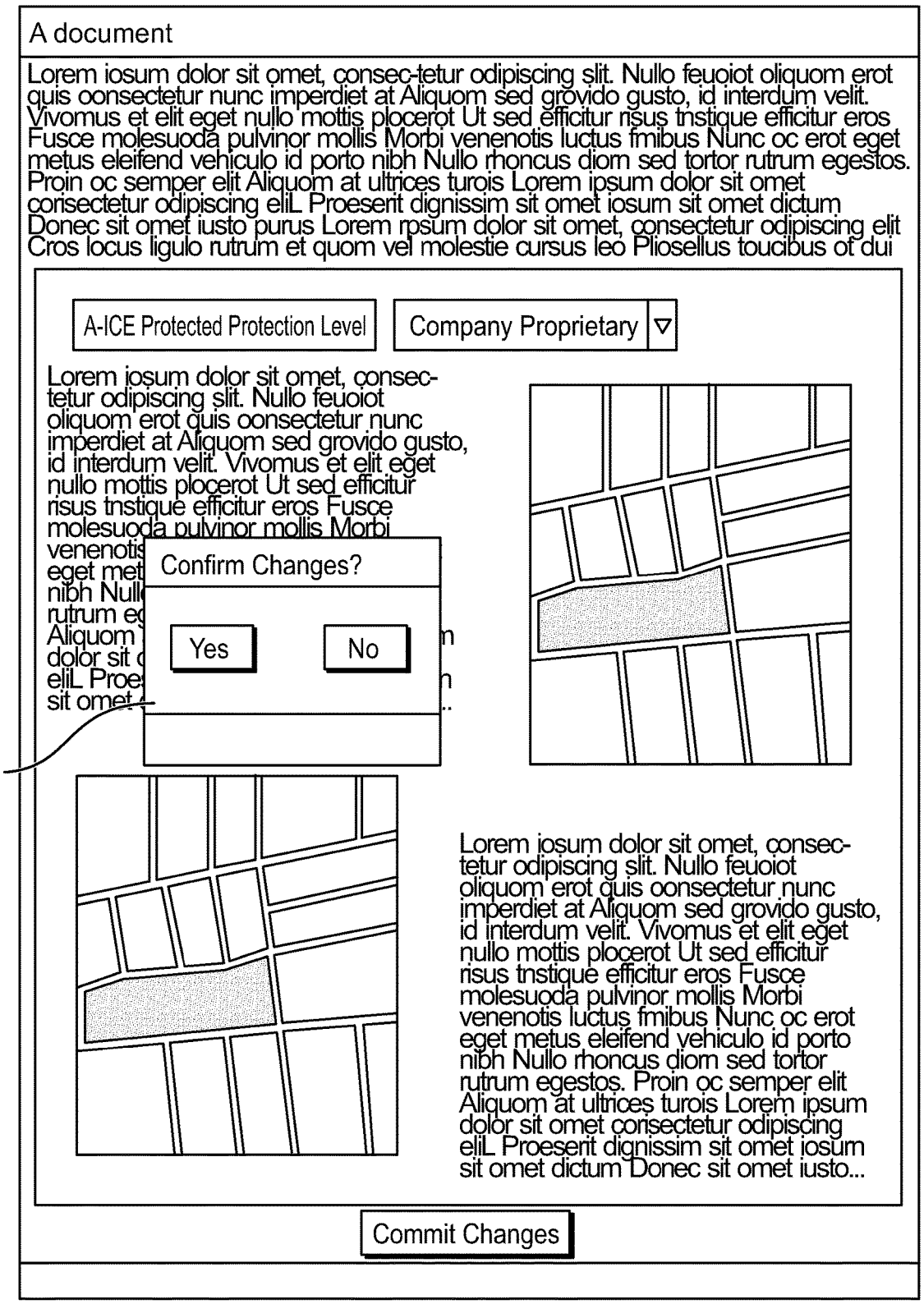
FIG. 9 illustrates another hypothetical screenshot of a file in accordance with aspects of the present disclosure.

As shown in FIG. 9, once the user has finished adding all content, the user may be prompted, for example by a context menu 902 or similar operation, to save and encrypt the content into the data. It should be noted that before the user selects this step, the data has not been committed to the document.

Figure 10:
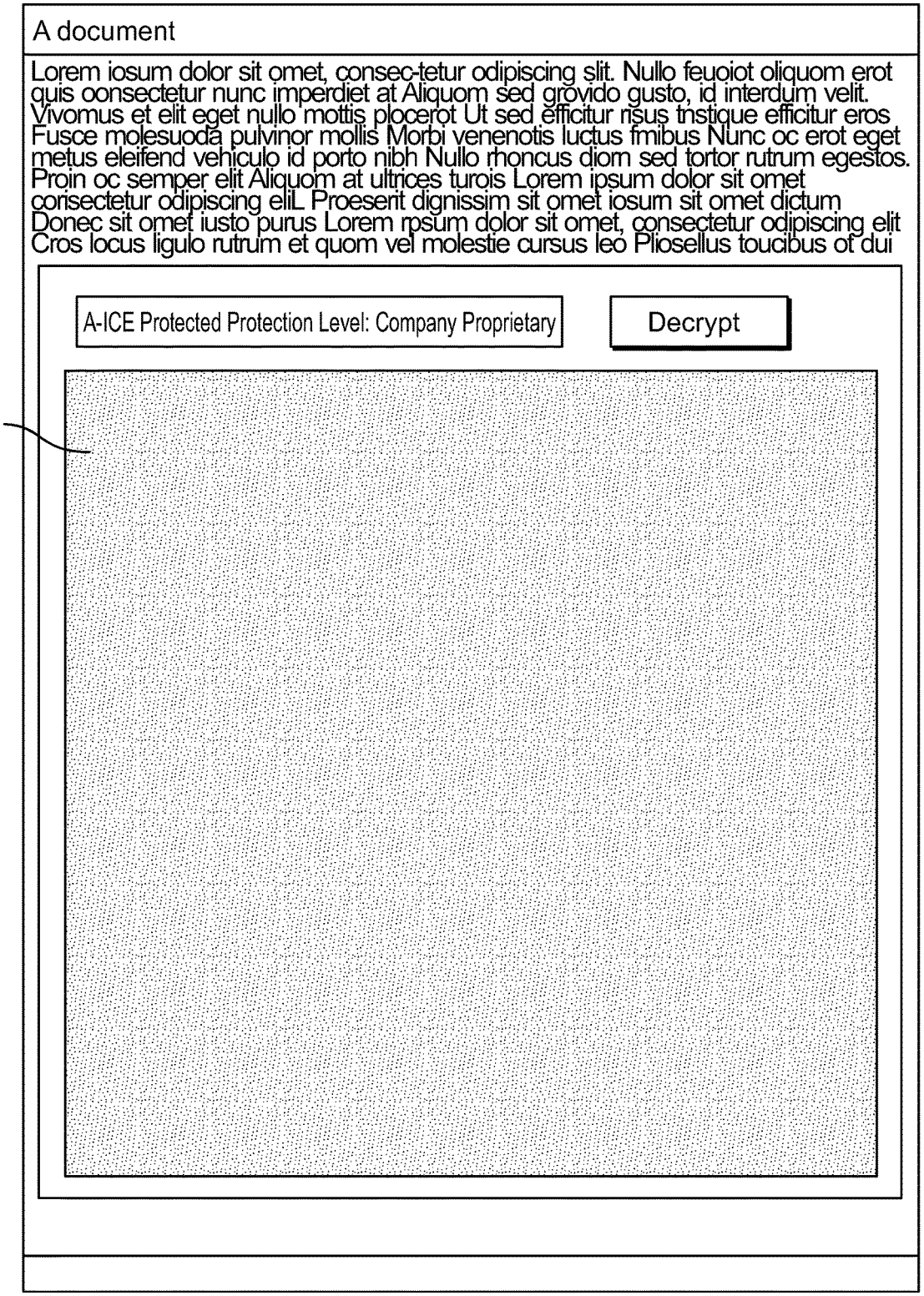
FIG. 10 illustrates another hypothetical screenshot of a file in accordance with aspects of the present disclosure.

The A-ICE system then inserts an encrypted string, image, or other representation of the data, that can only be decrypted with the A-ICE system and key that was used. Now, for purposes of discussion, let another user subsequently open the document protected with A-ICE. As shown in FIG. 10, the A-ICE system displays an overlay 1000 over the image used to store the encrypted data. To a user without an A-ICE system, the encrypted image will be displayed in its raw format with no context menu or operation available. In some embodiments, the image may be sized to match the size of the content encrypted with A-ICE to preserve document formatting.

As shown in FIG. 11, a user may select the "decrypt" option to restore the document to its original state, provided they have the appropriate encryption key available to A-ICE.

Figure 12:
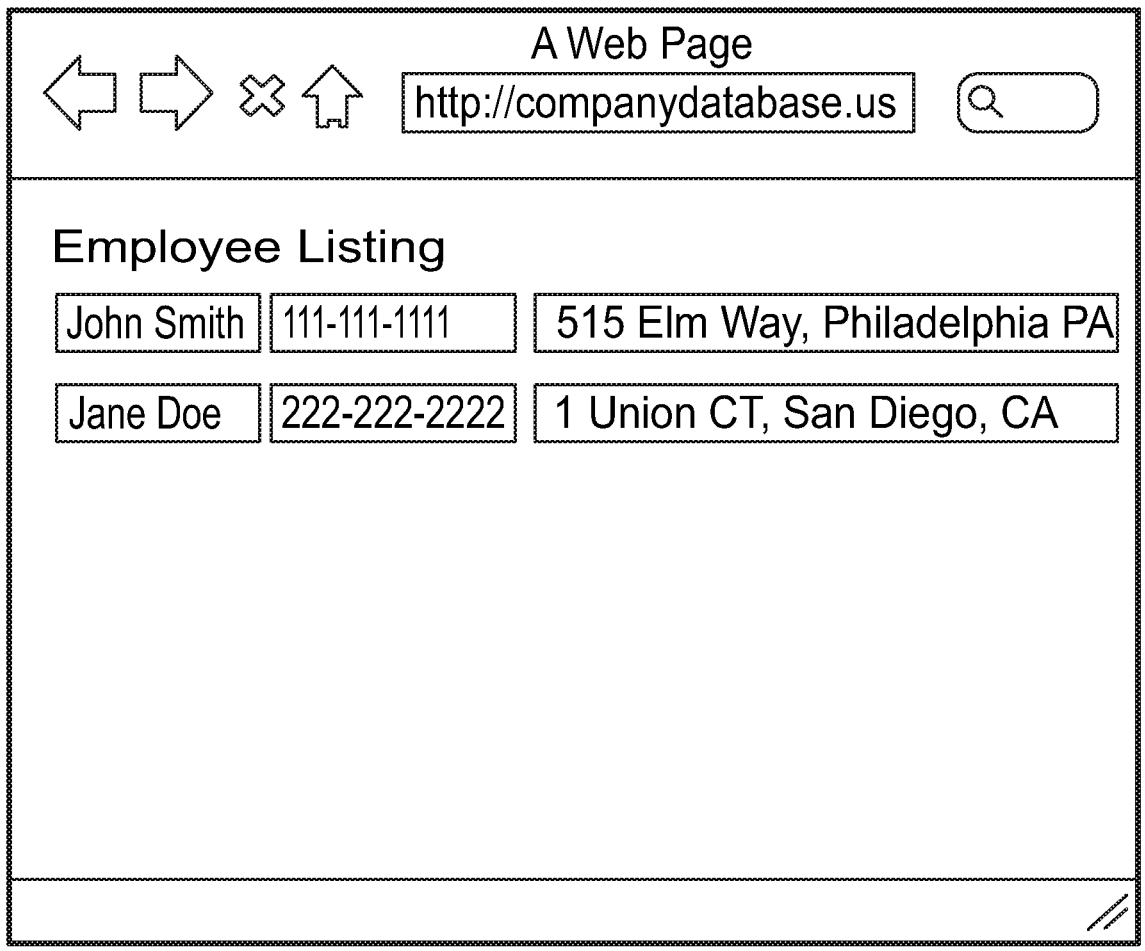
FIG. 12 illustrates another hypothetical screenshot of a file in accordance with aspects of the present disclosure.
Figure 13:
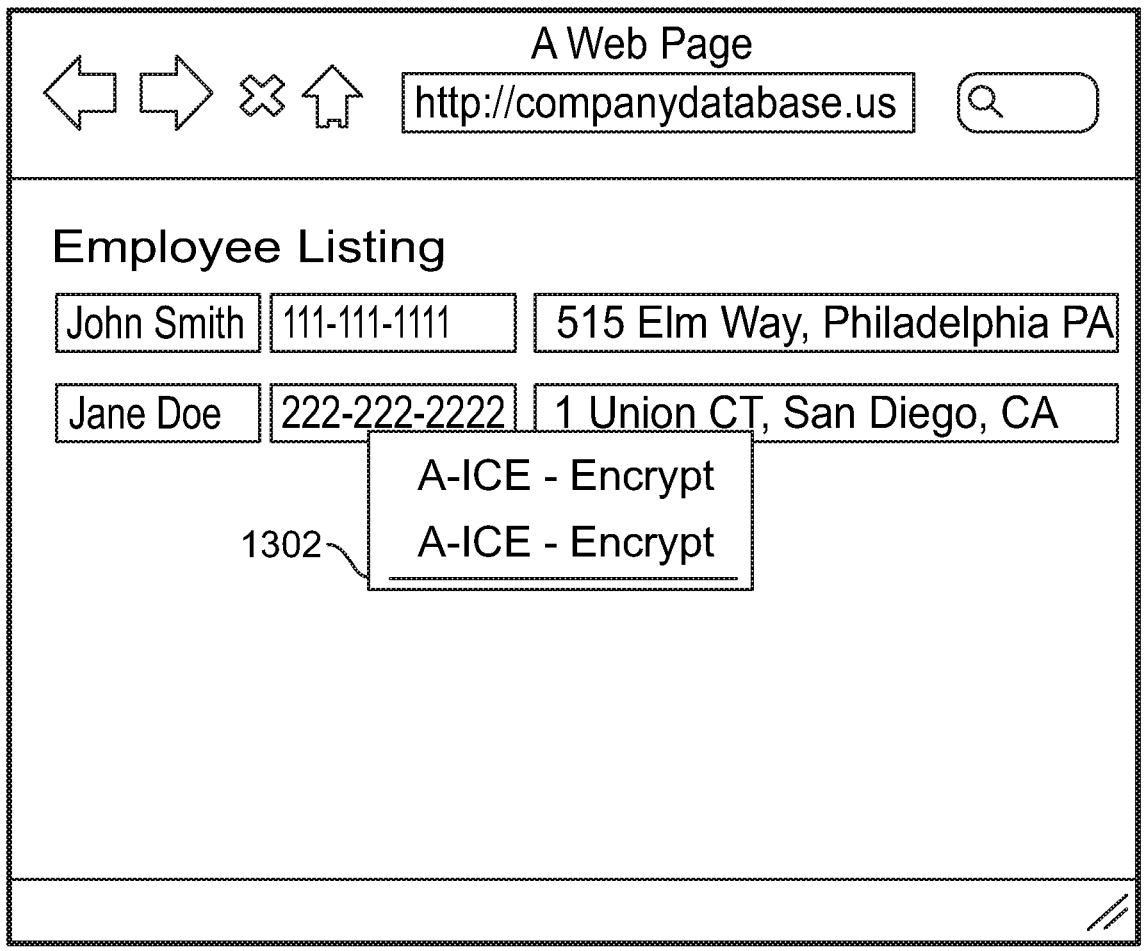
FIG. 13 illustrates another hypothetical screenshot of a file in accordance with aspects of the present disclosure.

Now consider a second example scenario, where users of both a human resources department and payroll department use an employee database as shown in FIG. 12. For purposes of this discussion, let the users in the human resources department need access to an employee's Social Security Number, whereas users in the payroll department need an employee's address to send paper paychecks. In the unencrypted image shown in FIG. 12, the data is not separated between departments, wherein users in the payroll department has access to information to which only users in the human resources department should have access, and vice versa. As shown in FIG. 13, using A-ICE in accordance with aspects of the present disclosure, a user can encrypt a particular field, without such features being necessarily supported by the application, for example by a context menu 1302 or similar operation.

Figure 14:
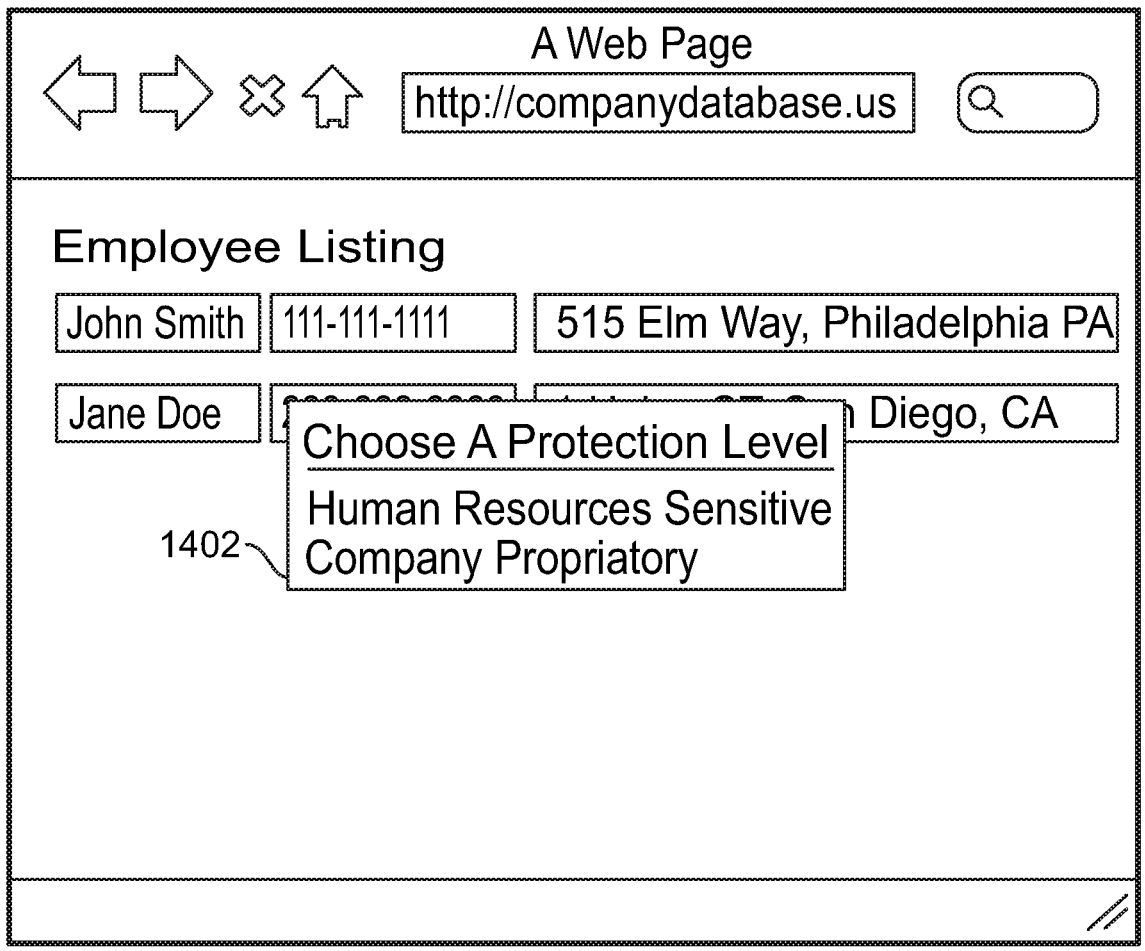
FIG. 14 illustrates another hypothetical screenshot of a file in accordance with aspects of the present disclosure.
Figure 15:
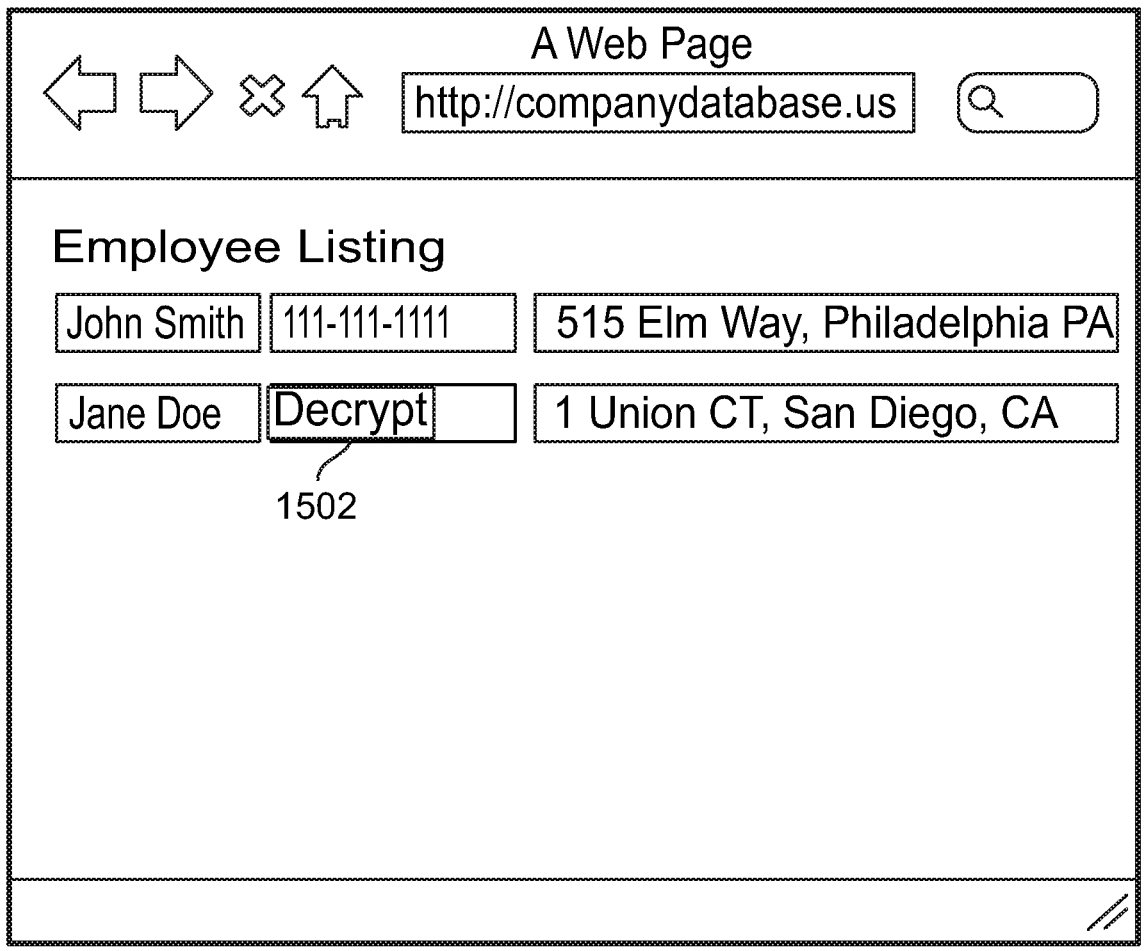
FIG. 15 illustrates another hypothetical screenshot of a file in accordance with aspects of the present disclosure.

As shown in FIG. 14, when encrypting with A-ICE, the user may be prompted, for example by a context menu 1402 or similar operation, to select what privilege level (key) to use. Once encrypted, the data may be stored as an encoded string, image, or other form. Further, as shown in FIG. 15, depending on the presence of A-ICE, the user may be prompted to decrypt the information, or be presented with unusable data, for example by a context menu 1502 or similar operation.

Figure 16:
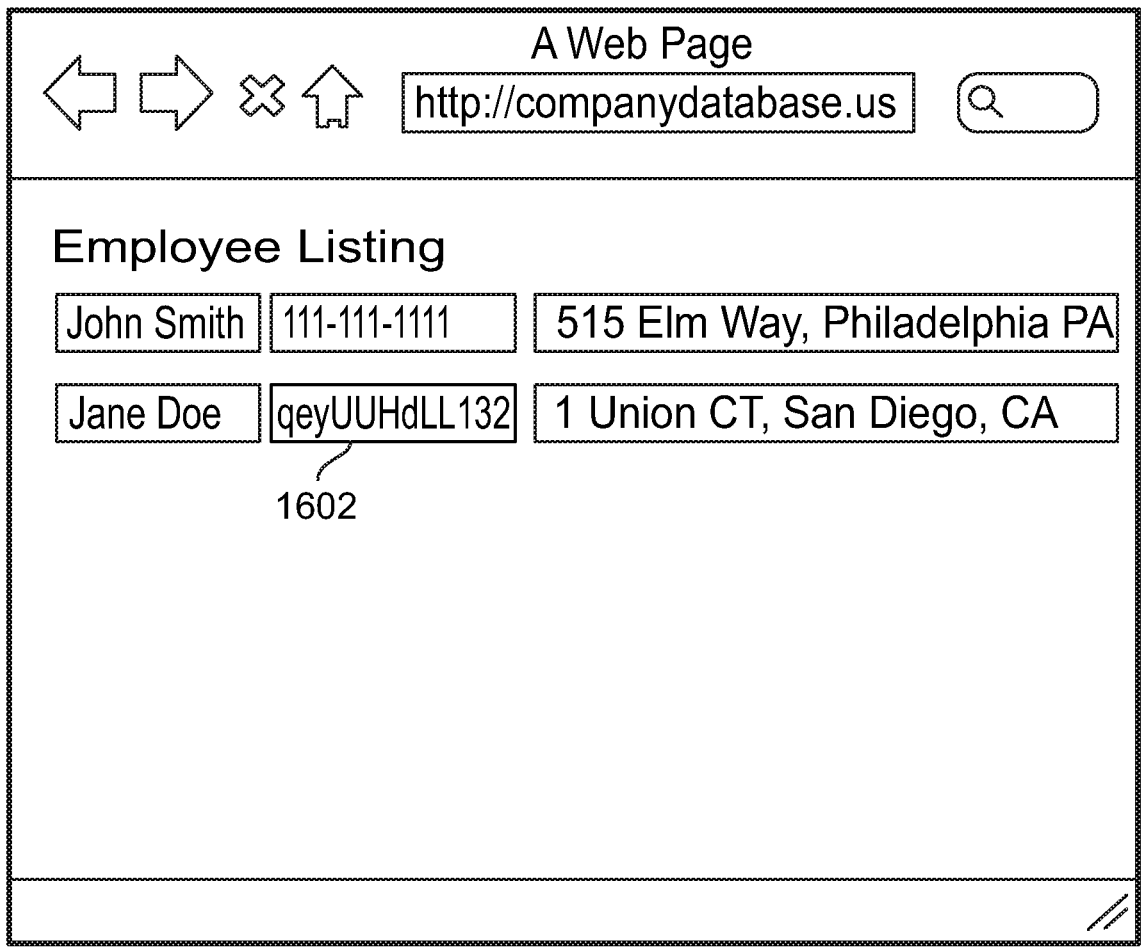
FIG. 16 illustrates another hypothetical screenshot of a file in accordance with aspects of the present disclosure.

However, as shown in FIG. 16, a user without A-ICE may be presented with an encoded and encrypted string 1602. Since the implementation stores the data in a format similar to the initial data, it will not be harmed or changed by users handling the data that do not change this field.

A system and method in accordance with the present disclosure provides significant enhancement over other prior art encrypting systems because of the following factors: the system being protected does not necessarily have to be designed to work with A-ICE; in many embodiments, overhead is generally lower due to the use of pre-shared symmetric keys, wherein files are authorized to a group as opposed to a specific user; and by transmitting keys out of band from the data store itself, a compromised data store cannot be used (without the keys being obtained elsewhere) to divulge sensitive information.

A-ICE keys can be regularly updated and a user's OB encryption component may contain a number of historical keys.

A-ICE may be designed to be used with pre-shared symmetric keys and may be configured to encrypt an additional document-specific key into a document. The main advantage to this is to allow keys to be updated in a regular fashion while keeping existing documents readable and self-updating over time.

A-ICE provides a way to seamlessly add encryption to existing documents and applications. By managing this purely between a pool of peers/clients, A-ICE addresses the problem of data spillage and mass data exfiltration (e.g. dumping entire databases and systems) by providing encryption that is handled entirely by authorized users and requires access to specific keys of which the workstation and memory within the workstation has no knowledge.

A-ICE provides a method to apply compartmentalized encryption to existing applications and documents (PDF, word, etc.) without major infrastructure changes.

Other types of methods that have more robust encryption (such as public-key) have their own set of drawbacks, which include: requirement that either the document store itself be able to decrypt the document; or, specifically encrypt a document to a particular user/key when creating it. On the other hand A-ICE can provide additional levels of protection on extremely sensitive data by providing another layer of protection, without altering the systems where the data is housed.

The A-ICE system includes a client and a key storage implementation within an OB encryption component, which may take the form of a physical store such as flash memory, smart card, or another physical storage medium.

The A-ICE system may interface with existing systems or with systems specifically designed to handle A-ICE encryption. In the latter case, a client may provide signatures to instruct A-ICE to perform encryption at specific sections or on specific data.

A-ICE may perform stream encryption using, for example, symmetric keys stored on an OB encryption component such as a smart card or other security device. By using a set of keys shared out-of-band with authorized users only, the client storage medium, where the data/files are stored, lacks the ability to decrypt the documents being stored. Additionally, since this is a set of pre-shared keys, encrypted documents can be created at a point in time before new authorized users are added, without having to re-encrypt the document.

A-ICE implementations may also include a set of plugins or add-ons to work with existing/legacy systems. For example this might include an addition to word processing software, web browser plugins, or similar.

The foregoing description of various embodiments has been presented for purposes of illustration and description. It is not intended to be exhaustive or to limit the disclosure to the precise forms disclosed, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the disclosure be defined by the claims appended hereto.

What is claimed as new and desired to be protected by Letters Patent of the United States is:

1. A method of encrypting a data file, said method comprising:
   opening the data file;
   selecting, via a user interface, a first portion and a second portion of the data file;
   encrypting, via an encryption component, the selected first portion of the data file as a first level of encryption associated with a first authorized user and the selected second portion of the data file as a second level of encryption associated with a second authorized user so as to create an encrypted data file; and
   saving the encrypted data file,
   wherein the encryption component includes an out-of-band encryption key component having stored therein, a first encryption key associated with the first level of encryption and a second encryption key associated with the second level of encryption.

2. The method of claim 1, further comprising:
   opening the encrypted data file;
   decrypting, via a second encryption component, the first selected portion if a second out-of-band encryption key component of the second encryption component stores the first encryption key associated with the first level of encryption, but not decrypting the first selected portion if the second out-of-band encryption key component does not store the first encryption key; and
   decrypting, via the second encryption component, the second selected portion if the second out-of-band encryption key component of the second encryption component stores the second encryption key associated with the second level of encryption, but not decrypting the second selected portion if the second out-of-band encryption key component does not store the second encryption key.

3. A method of encrypting a data file, said method comprising:
   opening the data file;
   selecting, via a first user interface, a portion of the data file;
   encrypting, via an encryption component, the selected portion of the data file as one of a first level of encryption associated with a first authorized user and a second level of encryption associated with a second authorized user so as to create an encrypted data file;
   saving the encrypted data file,
   wherein the encryption component includes an out-of-band encryption key component having stored therein, a first encryption key associated with the first level of encryption and a second encryption key associated with the second level of encryption;
   opening the encrypted data file;
   selecting, via a second user interface, a second portion of the encrypted data file;
   encrypting, via the encryption component, the selected second portion of the data file so as to create an updated encrypted data file; and
   saving the updated encrypted data file,
   wherein said encrypting, via the encryption component, the selected portion of the data file comprises encrypting the selected portion of the data file as the first level of encryption associated with a first authorized user, and
   wherein said encrypting, via the encryption component, the selected second portion of the data file comprises encrypting, via the encryption component, the selected second portion of the data file as the second level of encryption associated with the second authorized user.

4. The method of claim 3, wherein the first user interface is the second user interface.

5. The method of claim 4, further comprising:
   opening the updated encrypted data file; and
   decrypting, via a second encryption component, the selected portion,
   wherein the second encryption component includes a second out-of-band encryption key component having stored therein, the first encryption key associated with the first level of encryption.

6. The method of claim 5, further comprising:
   opening the updated encrypted data file; and
   decrypting, via a third encryption component, the selected second portion,
   wherein the third encryption component includes a third out-of-band encryption key component having stored therein, the second encryption key associated with the second level of encryption.

7. The method of claim 3, further comprising:
   opening the updated encrypted data file; and
   decrypting, via a second encryption component, the selected portion,
   wherein the second encryption component includes a second out-of-band encryption key component having stored therein, the first encryption key associated with the first level of encryption.

8. The method of claim 7, further comprising:
   opening the updated encrypted data file; and
   decrypting, via a third encryption component, the selected second portion,
   wherein the third encryption component includes a third out-of-band encryption key component having stored therein, the second encryption key associated with the second level of encryption.

9. A non-transitory, tangible, computer-readable media having computer-readable instructions stored thereon, the computer-readable instructions being capable of being read by a computer and being capable of instructing the computer to perform the method, said method comprising:
   opening a data file;
   selecting, via a first user interface, a portion of the data file;
   encrypting, via an encryption component, the selected portion of the data file as one of a first level of encryption associated with a first authorized user and a second level of encryption associated with a second authorized user so as to create an encrypted data file;
   saving the encrypted data file,
   wherein the encryption component includes an out-of-band encryption key component having stored therein, a first encryption key associated with the first level of encryption and a second encryption key associated with the second level of encryption;
   opening the encrypted data file;
   selecting, via a second user interface, a second portion of the encrypted data file;
   encrypting, via the encryption component, the selected second portion of the data file so as to create an updated encrypted data file; and
   saving the updated encrypted data file,
   wherein said encrypting, via the encryption component, the selected portion of the data file comprises encrypting the selected portion of the data file the first level of encryption associated with a first authorized user, and wherein said encrypting, via the encryption component, the selected second portion of the data file comprises encrypting, via the encryption component, the selected second portion of the data file as the second level of encryption associated with the second authorized user.

10. The non-transitory, tangible, computer-readable media of claim 9, the computer-readable instructions being capable of instructing the computer to perform the method wherein the first user interface is the second user interface.

11. The non-transitory, tangible, computer-readable media of claim 10, the computer-readable instructions being capable of instructing the computer to perform the method further comprising:
opening the updated encrypted data file; and
decrypting, via a second encryption component, the selected portion,
wherein the second encryption component includes a second out-of-band encryption key component having stored therein, the first encryption key associated with the first level of encryption.

12. The non-transitory, tangible, computer-readable media of claim 11, the computer-readable instructions being capable of instructing the computer to perform the method further comprising:
opening the updated encrypted data file; and
decrypting, via a third encryption component, the selected second portion,
wherein the third encryption component includes a third out-of-band encryption key component having stored therein, the second encryption key associated with the second level of encryption.

13. The non-transitory, tangible, computer-readable media of claim 9, the computer-readable instructions being capable of instructing the computer to perform the method further comprising:
opening the updated encrypted data file; and
decrypting, via a second encryption component, the selected portion,
wherein the second encryption component includes a second out-of-band encryption key component having stored therein, the first encryption key associated with the first level of encryption.

14. The non-transitory, tangible, computer-readable media of claim 13, the computer-readable instructions being capable of instructing the computer to perform the method further comprising:
opening the updated encrypted data file; and
decrypting, via a third encryption component, the selected second portion,
wherein the third encryption component includes a third out-of-band encryption key component having stored therein, the second encryption key associated with the second level of encryption.

15. A method of encrypting a data file, said method comprising:
opening the data file;
selecting, via a first user interface, a portion of the data file;
encrypting, via an encryption component, the selected portion of the data file as one of a first level of encryption associated with a first authorized user and a second level of encryption associated with a second authorized user so as to create an encrypted data file;
additionally encrypting the encrypted data file by way of a network encryption to generate a network encrypted data file; and
saving the network encrypted data file,
wherein the encryption component includes an out-of-band encryption key component having stored therein, a first encryption key associated with the first level of encryption and a second encryption key associated with the second level of encryption.

16. The method of claim 15, further comprising:
opening the network encrypted data file;
decrypting the network encrypted data file to obtain the encrypted data file;
selecting, via a second user interface, a second portion of the encrypted data file;
encrypting, via the encryption component, the selected second portion of the data file so as to create an updated encrypted data file; and
saving the updated encrypted data file,
wherein said encrypting, via the encryption component, the selected portion of the data file comprises encrypting the selected portion of the data file as the first level of encryption associated with a first authorized user, and
wherein said encrypting, via the encryption component, the selected second portion of the data file comprises encrypting, via the encryption component, the selected second portion of the data file as the second level of encryption associated with the second authorized user.

17. The method of claim 16, wherein the first user interface is the second user interface.

18. The method of claim 17, further comprising:
opening the updated encrypted data file; and
decrypting, via a second encryption component, the selected portion,
wherein the second encryption component includes a second out-of-band encryption key component having stored therein, the first encryption key associated with the first level of encryption.

19. The method of claim 18, further comprising:
opening the updated encrypted data file; and
decrypting, via a third encryption component, the selected second portion,
wherein the third encryption component includes a third out-of-band encryption key component having stored therein, the second encryption key associated with the second level of encryption.

20. The method of claim 16, further comprising:
opening the updated encrypted data file; and
decrypting, via a second encryption component, the selected portion,
wherein the second encryption component includes a second out-of-band encryption key component having stored therein, the first encryption key associated with the first level of encryption.

* * * * *